(12) United States Patent  
Hoffmeyer et al.

(10) Patent No.: US 11,911,935 B2  
(45) Date of Patent: Feb. 27, 2024

(54) SPREADER ROLL FOR A DISTRIBUTING DEVICE

(71) Applicant: IPCO Germany GmbH, Fellbach (DE)

(72) Inventors: Frank Hoffmeyer, Donzdorf (DE); Hans-Kurt Schromm, Backnang (DE)

(73) Assignee: IPCO GERMANY GMBH, Fellbach (DE)

( * ) Notice: Subject to any disclaimer, the term of this patent is extended or adjusted under 35 U.S.C. 154(b) by 212 days.

(21) Appl. No.: 17/616,772

(22) PCT Filed: May 6, 2020

(86) PCT No.: PCT/EP2020/062577  
§ 371 (c)(1),  
(2) Date: Dec. 6, 2021

(87) PCT Pub. No.: WO2020/244876  
PCT Pub. Date: Dec. 10, 2020

(65) Prior Publication Data  
US 2022/0347895 A1 Nov. 3, 2022

(30) Foreign Application Priority Data  
Jun. 7, 2019 (DE) .................... 20 2019 002 531.6

(51) Int. Cl.  
*B29C 43/34* (2006.01)  
*B29L 31/00* (2006.01)

(52) U.S. Cl.  
CPC ......... *B29C 43/34* (2013.01); *B29L 2031/732* (2013.01)

(58) Field of Classification Search  
CPC ........ A47L 9/0477; A47L 11/18; A47L 11/19; B29C 2043/46; B29C 2043/461; (Continued)

(56) References Cited  
U.S. PATENT DOCUMENTS 3,602,080 A * 8/1971 Sickel .................. B26D 7/1863  
                                                         83/345  
3,683,444 A * 8/1972 Schaefer ................ A46B 13/00  
                                                         15/183

(Continued)

FOREIGN PATENT DOCUMENTS

| CN | 2296809 Y | 11/1998 |
|---|---|---|
| CN | 103648458 A | 3/2014 |

(Continued)

OTHER PUBLICATIONS

English translation of EP 1938934 A1 (Year: 2008).*  
(Continued)

*Primary Examiner* — Jason L Vaughan  
(74) *Attorney, Agent, or Firm* — FLYNN THIEL, P.C.

(57) ABSTRACT

A spreader roll for a distributing device for granular material or fibers, the spreader roll having a load-bearing cylindrical core, and being rotatably mountable to a frame of the distributing device. At least part of the outer circumference of the core is provided with a plastics trimming fitted with (Continued)

bristles and/or pins, the plastics trimming being tubular and being non-destructively detachably mounted to the core and secured against rotation.

16 Claims, 3 Drawing Sheets

(58) Field of Classification Search
CPC ...... B29C 2043/464; B29C 2043/3422; B29C 2043/3427
USPC ..................................................... 492/30, 36
See application file for complete search history.

(56) References Cited

U.S. PATENT DOCUMENTS

| | | | | |
|---|---|---|---|---|
| 3,956,974 A * | 5/1976 | Schroter | ............. | B26D 7/1818 493/373 |
| 4,209,873 A * | 7/1980 | Schaefer | ............... | A47L 9/0477 15/366 |
| 4,268,769 A * | 5/1981 | Dorner | ................. | A47L 9/0477 310/67 R |
| 4,307,479 A * | 12/1981 | Mertes | .................... | A46B 7/04 15/207.2 |
| 4,384,386 A * | 5/1983 | Dorner | .................. | H02K 23/00 310/67 R |
| 6,257,414 B1 | 7/2001 | Gerhardt et al. | | |
| 6,409,856 B1 | 6/2002 | Wiemann | | |
| 6,550,099 B2 * | 4/2003 | Worwag | ............... | A47L 9/0416 15/387 |
| 6,612,446 B1 | 9/2003 | Scriba et al. | | |
| 6,848,147 B2 * | 2/2005 | Syverson | .............. | A47L 9/0477 15/389 |
| 6,859,970 B2 * | 3/2005 | Roney | .................. | A47L 9/0477 15/179 |
| 7,008,123 B2 * | 3/2006 | Camp | .................. | G03F 7/0027 492/30 |
| 9,456,929 B2 | 10/2016 | Maruhata | | |
| 2004/0211489 A1 * | 10/2004 | Isley | ....................... | B27B 25/02 144/246.1 |
| 2006/0272122 A1 * | 12/2006 | Butler | .................. | A47L 9/0455 15/383 |

FOREIGN PATENT DOCUMENTS

| | | | |
|---|---|---|---|
| CN | 104790244 A | 7/2015 | |
| CN | 106040526 A | 10/2016 | |
| CN | 206483515 U | 9/2017 | |
| DE | 19503407 A1 | 8/1996 | |
| DE | 29617541 U1 | 1/1997 | |
| DE | 19857498 C1 | 6/2000 | |
| DE | 29824114 U1 | 6/2000 | |
| DE | 102006062396 A1 | 6/2008 | |
| DE | 202015105864 U1 | 3/2017 | |
| EP | 686963 A2 * | 12/1995 | ............... B26F 1/24 |
| EP | 1010508 A1 | 6/2000 | |
| EP | 1231039 A2 | 8/2002 | |
| WO | 0020180 A1 | 4/2000 | |

OTHER PUBLICATIONS

Office Action issued in corresponding Chinese Application No. 202080041926.9, dated Sep. 15, 2022 (7 pages).
German Office Action issued in corresponding German Application No. 20 2019 002 531.6 dated Jan. 21, 2020 (5 pages).
International Search Report with English Translation issued in corresponding International Application No. PCT/EP2020/062577 dated Sep. 14, 2020 (6 pages).
Written Opinion of International Searching Authority issued in corresponding International Application No. PCT/EP2020/062577 dated Sep. 14, 2020 (6 pages).

* cited by examiner

SPREADER ROLL FOR A DISTRIBUTING DEVICE

TECHNICAL FIELD

The invention relates to a spreader roll for a distributing device for granular material or fibers, wherein the spreader roll has a load-bearing, cylindrical core and can be rotatably mounted on a frame of the distributing device, and wherein a plastic trim fitted with bristles and/or pins is provided on at least part of the outer circumference of the core.

BACKGROUND AND SUMMARY

The invention is intended to improve the manageability of a spreader roll.

For this purpose, a spreader roll for a distributing device for granular material or fibers is provided, wherein the spreader roll has a load-bearing, cylindrical core, can be rotatably mounted on a frame of the distributing device, and wherein a plastic trim fitted with bristles and/or pins is provided on at least part of the outer circumference of the core, in which the plastic trim is tubular and is co-rotationally and non-destructively detachably fixed to the core.

Spreader rolls are used in distributing devices with which a granular material or else fibers are to be spread uniformly over the width of the roll. For example, plastic granules are spread uniformly onto a metal belt of a press, and then a floorcovering is produced from the plastic granules in the press. In numerous applications with which flat materials are to be produced from fibers and/or granular material, distributing devices having spreader rolls are needed in order to spread the granular material or the fibers uniformly over the width of a carrier belt, for example a plastic belt or a steel belt. The spreader roll according to one aspect of the invention can be arranged at the outlet of a hopper so that, during rotation of the spreader roll, granular material or fibers are removed uniformly from the hopper and spread onto the carrier. In the case of fibers and specific types of granular material, the spreader roll is likewise arranged at the outlet of a hopper but a further spreader roll then accepts the material discharged from the hopper by means of the first spreader roll or brushes the material out of the first spreader roll, so that said material then reaches the carrier. Depending on the material to be spread, the spreader rolls have different bristles and/or pins in the plastic trim and/or the bristles and/or pins are fixed to the plastic trim in different patterns. Bristles are usually secured in blind holes in the plastic trim. Pins are inserted into blind holes in the plastic trim.

Because, one aspect of the invention, the plastic trim is tubular and co-rotationally and non-destructively detachably fixed to the core, the plastic trim can be replaced in a simple way if, for example, the bristles and/or pins are worn. In conventional spreader rolls, the plastic trim is non-detachably fixed to the load-bearing core and must be destroyed when the spreader roll is overhauled, for example by being turned off the core by means of a turning tool. Since the spreader rolls have widths from about 0.5 m to several meters, transport into a workshop which is equipped with suitable means for removing the plastic trim in conventional spreader rolls is very complicated. Here, the invention according to one aspect provides a remedy, in that the plastic trim is tubular and co-rotationally and non-destructively detachably fixed to the core. A plastic trim having worn bristles and/or pins can consequently be drawn off the cylindrical core and replaced by a new plastic trim. The plastic trim is of course substantially lighter and therefore easier to handle than the complete spreader roll and, as a result, can also be easily dispatched. Primarily, however, for the renewal of the plastic trim in the spreader roll, no special tool for turning the plastic trim off the load-bearing core is needed. Instead, the plastic trim can be drawn off the load-bearing, cylindrical core in a simple way and a new plastic trim can be pushed onto the core. As such, it is possible, for example, for several plastic trims to be kept in stock for replacement at the location of a distributing device. Since the plastic trim costs only a fraction of the price of the complete spreader roll, this is also possible in an economical manner.

According to one embodiment of the invention, the plastic trim is subdivided into a plurality of tubular segments, as viewed over a length of the load-bearing core.

In this way, the handling of the plastic trim can be further facilitated. The production of the plastic trim is also made considerably easier since, for example, a plastic trim having a length of several meters can be produced in the form of a plurality of tubular segments. A plurality, for example of only 0.5 m long tubular segments each, can be produced substantially more precisely than a, for example, 3 m to 4 m long tubular plastic trim. In addition, the transport and the storage of a plastic trim subdivided into a plurality of tubular segments are substantially simpler as compared with the transport of a plastic trim that is not subdivided or even a conventional spreader roll.

According to an embodiment of the invention, at least one feather key is provided between an inner circumference of the plastic trim and an outer circumference of the core.

A feather key is a strip which on the one hand engages in a groove in the core and on the other hand in a groove in the plastic trim. Feather keys are obtainable as inexpensive standard parts. By means of a feather key or a plurality of feather keys between the plastic trim and the core, a rotary position of the plastic trim on the core can be determined, and the tubular plastic trim can be fixed co-rotationally but displaceably in the longitudinal direction of the core and therefore non-destructively detachably to the core. For example, three feather keys, which are spaced apart uniformly from one another over the circumference of the core, are used between the plastic trim and the core.

In one embodiment of the invention, a diameter of the inner circumference of the plastic trim and a diameter of the outer circumference of the core are matched to each other in such a way that the plastic trim can be pushed onto the core but sits on the core without play.

In this way, the spreader roll can be made extremely precisely and with low tolerances, which is necessary for a uniform spreading result. At the same time, the plastic trim can nevertheless be non-destructively detachably fixed on the core.

In one embodiment of the invention, the core is provided with a stop on its outer circumference at one end and with a thread for a nut to be screwed on at its opposite end.

In the longitudinal direction of the spreader roll, and therefore in the direction of the width of the spreader roll, the plastic trim can therefore be clamped in securely between the stop and the nut and locked. This is advantageous in particular when the plastic trim is subdivided into a plurality of tubular segments, which are then preloaded against one another by means of the stop and the nut screwed on and as a result rest on one another without play.

In one embodiment of the invention, the core consists of steel or plastic, in particular carbon fiber-reinforced plastic.

Steel load-bearing cores can be produced highly precisely but are comparatively heavy. With large spreader roll widths, for example widths from 3 m to 4 m, this leads to a high weight, and the inherent weight of the spreader roll can also lead to sagging of the spreader roll. Load-bearing cores made of carbon fiber-reinforced plastic can likewise be produced highly precisely and have the advantage of being substantially lighter than steel cores.

In one embodiment of the invention, the plastic trim is formed from polyoxymethylene (POM) or polyamide (PA).

Both polyoxymethylene and polyamide are plastics with a high density, which can be machined extremely precisely and with low tolerances. As a result, it is possible to fabricate a tubular plastic trim so precisely that it can be pushed onto the core but sits on the core without play. In addition, bristles and/or pins can be anchored securely and precisely in a plastic trim made of polyoxymethylene or polyamide.

BRIEF DESCRIPTION OF THE DRAWINGS

Further features and advantages of the invention emerge from the claims and the following description of a preferred embodiment of the invention in conjunction with the drawings, in which:

DETAILED DESCRIPTION

Figure 1:
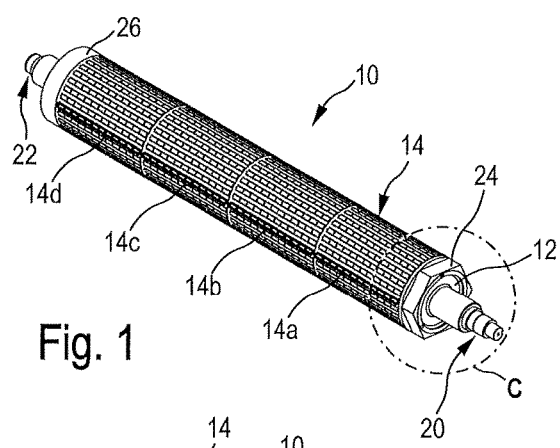
FIG. 1 shows a view of a spreader roll according to the invention obliquely from the front.
Figure 3:
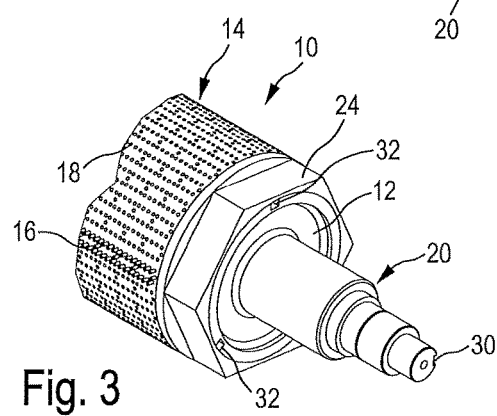
FIG. 3 shows an enlarged illustration of the detail C from FIG. 1.
Figure 4:
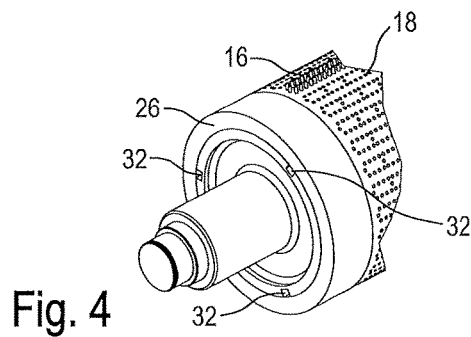
FIG. 4 shows an enlarged illustration of the detail D from FIG. 2.

The illustration of FIG. 1 shows a spreader roll 10, which has a load-bearing core 12 and a tubular plastic trim 14 arranged on the load-bearing core 12. The plastic trim 14, seen over its circumference, is provided with numerous pins 16, cf. FIG. 3 and FIG. 4, which project in the radial direction. The pins are each arranged in blind holes 18 in the plastic trim 14. In FIG. 3 and FIG. 4, only some of the pins 16 are illustrated, and several of the blind holes 18 in the plastic trim 14 are illustrated without inserted pins 16. Instead of the pins 16 that can be seen in FIG. 3 and FIG. 4, for example bristles can also be inserted into the blind holes. A mixed arrangement of bristles and pins is possible. The number and arrangement of the pins and/or bristles on the plastic trim 14 is selected in a manner depending on the intended application.

The load-bearing core 12 is provided with bearing journals 20, 22 at both ends, which are then rotatably mounted in a distributing device.

In a distributing device, the spreader roll 10 is typically arranged underneath an outlet opening of a hopper. The width of the outlet opening usually corresponds to the width of the plastic trim 14 of the spreader roll 10, so that granular material or fibers moving out of the hopper can reach the plastic trim 14 over the entire width of the plastic trim 14 of the spreader roll 10 and can be discharged from the hopper. An interspace between the outer circumference of the plastic trim 14 of the spreader roll 10 and the outlet opening of the hopper is dimensioned such that granular material and/or fibers are discharged from the hopper only when the spreader roll 10 rotates. As a result, the quantity of granular material and/or fibers discharged can be adjusted via a rotational speed of the spreader roll 10. From the outer circumference of the spreader roll 10, the discharged granular material and/or the discharged fibers then usually fall onto a transport belt, for example a plastic belt or a steel belt, and are then processed in a following press and/or heating device to form a compact, flat covering. In the case of fibers and special granular materials, it is also usual to provide a further spreader roll in addition to the spreader roll 10, which is also designated as a brushing roller and which then brushes or picks up the granular material and/or fibers accommodated between the pins and/or bristles of the spreader roll 10 and only then deposits them on a belt-like carrier.

FIG. 1 reveals that, in the region of a first end of the load-bearing core, a nut 24 is screwed onto the core 12. At the opposite end, the core 12 is provided with a circumferential stop 26. The plastic trim 14 is fixed in the longitudinal direction of the spreader roll 10, i.e. in the axial direction of the spreader roll 10, by means of the stop 26 and the nut 24. The nut 24 is preloaded here, so that the plastic trim 14 rests on the stop 26 and on the nut 24 without play. As will be explained further, the plastic trim 14 comprises a plurality of tubular segments 14a, 14b, 14c and 14d, which are preloaded against one another by means of the nut 24 and the stop 26 and thus bear on one another with their end faces without play.

Figure 2:
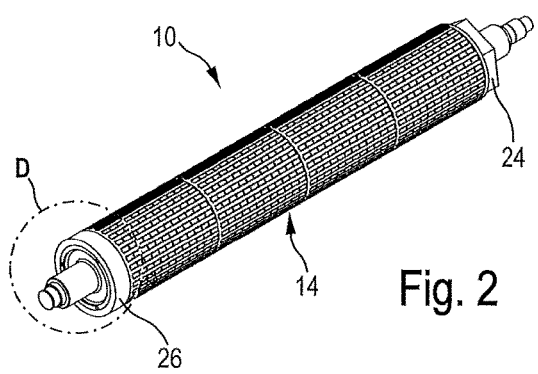
FIG. 2 shows a view of the spreader roll from FIG. 1 obliquely from the rear.

FIG. 2 shows the spreader roll 10 from FIG. 1 in a view obliquely from the rear. In this view, the stop 26 faces the observer.

FIG. 3 shows the detail C from FIG. 1 in an enlarged illustration. It is possible to see the bearing journal 20 at the end of the load-bearing core 12. The bearing journal 20 is stepped with respect to its diameter. At its free end, the bearing journal 20 has a groove 30 running in the longitudinal direction of the spreader roll 10. It is possible, for example, for a feather key to be pushed into this groove 30, which feather key then engages, in turn, in a drive device for the spreader roll 10.

In the region of the nut 24, it can be seen that an outer circumference of the core 12 is provided with a plurality of grooves 32 that are continuous in the longitudinal direction. The grooves 32 are not provided in the region of the bearing journals 20, 22. Overall, three grooves 32 that are continuous in the longitudinal direction are provided on the outer circumference of the load-bearing core 12, cf. FIG. 4. Feather keys are inserted into these grooves 32 and are then arranged on the one hand in the grooves 32 of the load-bearing core 12 and on the other hand in grooves on the inner circumference of the plastic trim 14. By means of such feather keys, which cannot be seen in FIGS. 3 and 4 but which can be obtained as standard parts, the plastic trim 14 can be fixed co-rotationally on the load-bearing core 12.

In FIG. 3 and FIG. 4, it is also possible to see some of the pins 16, which are inserted into blind holes 18 in the plastic trim 14 and which extend in the radial direction relative to the longitudinal axis of the spreader roll 10. The pattern in which the pins 16 and blind holes 18 are arranged depends on the envisaged application of the spreader roll 10, and consequently on which granular material or which fibers are to be spread by means of the spreader roll 10.

Figure 5:
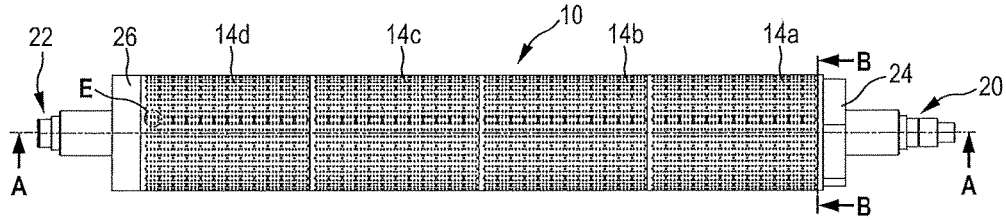
FIG. 5 shows a side view of the spreader roll from FIG. 1.

The illustration of FIG. 5 shows a side view of the spreader roll 10 from FIG. 1. The two bearing journals 20, 22 each project beyond a cylindrical section with a constant diameter of the load-bearing core 12, as seen in the longitudinal direction. On the side of the bearing journal 22, at one end of the cylindrical section, the stop 26 is provided and, on the side of the bearing journal 20 at the other end of the cylindrical section, the nut 24 is provided. The grooves 32, which cannot be seen in FIG. 5, extend from the right-hand end of the cylindrical section in FIG. 5 as far as the stop 26.

Figure 6:
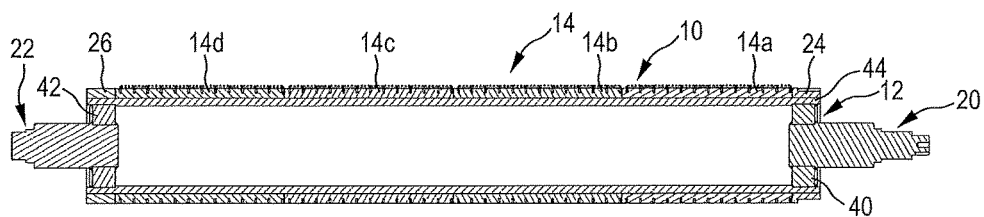
FIG. 6 shows a view of the section plane A-A in FIG. 5.

FIG. 6 shows a view of the section plane A-A in FIG. 5. It can be seen that the spreader roll 10 and, specifically, the load-bearing core 12 of the spreader roll 10, is designed to be hollow inside. The bearing journal 20 is accommodated in a first end cover 40 of the load-bearing core, which in turn is fixed to a first end of a hollow cylinder 44 and, as a result, closes the interior of the hollow cylinder 44 on one side.

The bearing journal 22 opposite the bearing journal 20 is arranged in a second end cover 42, which in turn closes the opposite end of the hollow cylinder 44. An outer circumference of the hollow cylinder 44 is circularly cylindrical. The outer circumference of the hollow cylinder 44 forms the cylindrical section on which the plastic trim 14 is arranged. At the height of the end cover 42, the annular stop 26 is fixed on the outer circumference of the hollow cylinder 44. The nut 24 is screwed onto an external thread of the hollow cylinder 44 in the region of the first end cover 40. In the region between the nut 24 and the stop 26, the hollow cylinder 44 forms the circularly cylindrical section of constant diameter, this diameter being larger than the diameter of the bearing journals 20, 22.

Pushed onto this circularly cylindrical section on the outer circumference of the hollow cylinder 44 are the four tubular segments 14a, 14b, 14c, and 14d which together form the plastic trim 14. The tubular segments 14a, 14b, 14c, 14d are braced against one another by means of the nut 24 and the stop 26, so that the end face of the tubular segment 14a on the right in FIG. 6 bears on the nut 24 without play, the end face of the tubular segment 14d arranged on the left in FIG. 6 bears on the stop 26 without play, and the end faces of the tubular segments 14b, 14c bear on one another or on the end faces of the tubular segments 14a, 14b that face them without play. It is important for the function of the spreader roll 10 according to the invention that the end faces of the tubular segments 14a, 14b, 14c, 14d bear on one another without play. As a result, an outer circumference of the plastic trim 14 is made extremely precisely and with extremely low deviations from a circularly cylindrical shape, so that a uniform spreading result can be ensured over the entire length of the plastic trim 14.

The tubular segments 14a, 14b, 14c, 14d are arranged without play on the outer circumference of the hollow cylinder 44. The inner circumference of the tubular segments 14a, 14b, 14c, 14d is matched so precisely to the outer circumference of the hollow cylinder 44 that the tubular segments 14a, 14b, 14c, 14d can be pushed onto the outer circumference of the hollow cylinder 44 when the nut 24 is removed. However, when they are pushed on, they are then arranged on the hollow cylinder 44 without play in the radial direction.

Figure 7:
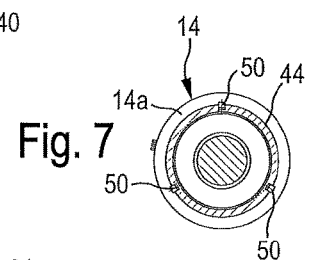
FIG. 7 shows a view of the section plane B-B in FIG. 5.

In the illustrated embodiment, an anti-rotation lock of the plastic trim 14 relative to the load-bearing core 12, and therefore an anti-rotation lock of the tubular segments 14a, 14b, 14c, 14d relative to the outer circumference of the hollow cylinder 44, is achieved in that the outer circumference of the hollow cylinder 44 is provided with three grooves 32 that are continuous in the longitudinal direction and in each of which a plurality of feather keys 50 are arranged one after another (see FIG. 7). An inner circumference of the plastic trim 14, that is to say an inner circumference of the tubular segments 14a, 14b, 14c, 14d, is likewise provided with three grooves spaced apart uniformly from one another in the circumferential direction. The feather keys 50 are dimensioned such that they engage on the one hand in the grooves 32 in the outer circumference of the hollow cylinder 44 and on the other hand in the grooves on the inner circumference of the tubular segments 14a, 14b, 14c, 14d of the plastic trim 14. By means of the feather keys 50, the tubular segments 14a, 14b, 14c, 14d can be arranged such that they cannot rotate on the load-bearing core 12 and such that they cannot rotate on the outer circumference of the hollow cylinder 44.

Figure 8:
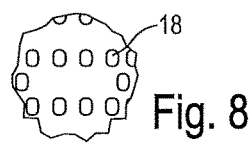
FIG. 8 shows an enlarged illustration of the detail E in FIG. 5.

FIG. 8 shows the detail E in FIG. 5 in an enlarged illustration. FIG. 8 shows a detail of the hole pattern which is formed by the blind holes 18 in the plastic trim 14. It can be gathered from FIG. 8 that the blind holes 18 have an oval cross section. When circularly cylindrical pins 16 are driven into the blind holes 18, the blind holes 18 are widened as a result and, at the same time, the pins 16 are pressed into the blind holes 18 and as a result are arranged in a captive manner in the blind holes 18.

Figure 9:
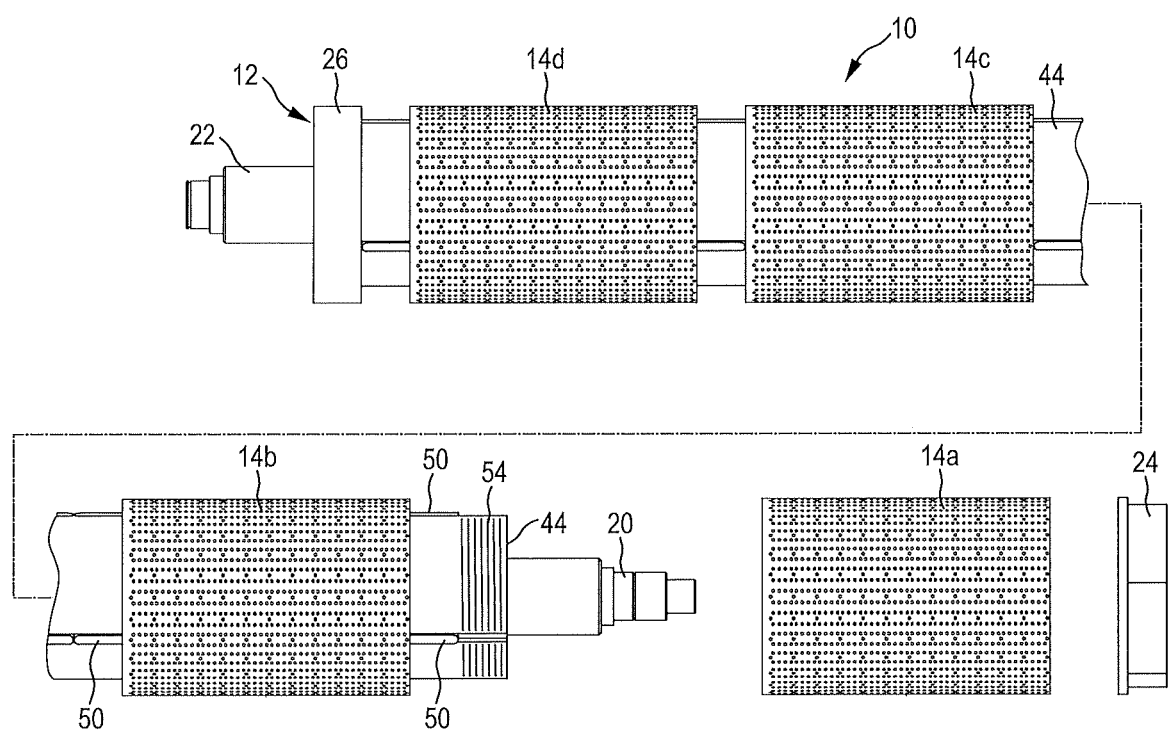
FIG. 9 shows an exploded illustration of the spreader roll from FIG. 1 in the partly assembled state.

FIG. 9 shows the spreader roll 10 from FIG. 1 in an exploded, cut apart and partially assembled state. In the state in FIG. 9, only the tubular segments 14b, 14c and 14d have already been pushed onto the outer circumference of the hollow cylinder of the load-bearing core 12. The front face of the tubular segment 14d (illustrated on the left in FIG. 9) is still spaced apart from the stop 26. In addition, there is still a spacing between the tubular segment 14d and the tubular segment 14c, and also between the tubular segment 14c and the tubular segment 14b. As a result, FIG. 9 shows how the feather keys 50 are inserted into the grooves 32 in the outer circumference of the hollow cylinder 44. Since the grooves 32 in the outer circumference of the hollow cylinder 44 and the grooves, which cannot be seen in FIG. 9, on the inner circumference of the tubular segments 14a, 14b, 14c, 14d extend in the longitudinal direction of the spreader roll 10, the tubular segments 14a, 14b, 14c, 14d can be pushed onto the hollow cylinder 44 in the longitudinal direction.

If, starting from the state of FIG. 9, the front face, illustrated on the left in FIG. 9, of the tubular segment 14d is bearing on the stop 26, and also the tubular segments 14a, 14b, 14c are pushed onto the hollow cylinder 44 such that their front faces bear on one another, the nut 24 is screwed on to an external thread 54, merely indicated schematically in FIG. 9, on the end of the hollow cylinder 44 that is on the right in FIG. 9. By means of the nut 24, the tubular segments 14a, 14b, 14c, 14d can be preloaded against each other and against the stop 26, as viewed in the longitudinal direction of the spreader roll 10.

If the plastic trim 14 is worn, that is to say if, for example, the pins 16 of the plastic trim 14 are worn, the plastic trim 14 can be replaced in a simple way by the nut 24 being unscrewed from the hollow cylinder 44 and the tubular segments 14a, 14b, 14c, 14d being drawn off the hollow cylinder 44 again. As has been explained, new tubular segments 14a, 14b, 14c, 14d can be pushed onto the hollow cylinder 44 again and secured and preloaded against one another by means of the nut 24. The feather keys 50 ensure an anti-rotation lock between the tubular segments 14a, 14b, 14c, 14d of the plastic trim 14 and the core 12 and the outer circumference of the hollow cylinder 44 of the core 12.

The invention claimed is:

1. A spreader roll for a distributing device for granular material or fibers, the spreader roll comprising a load-bearing, cylindrical core with an outer circumference, the spreader roll being rotatably mountable on a frame of the distributing device and having at least one integral, one-piece tubular plastic trim component fitted with bristles and/or pins, the at least one integral, one-piece tubular plastic trim component extending around an entirety of the outer circumference of the core, and the integral, one-piece tubular plastic trim component being non-destructively and detachably fixed to the core for rotation therewith.

2. The spreader roll as claimed in claim 1, wherein the at least one integral, one-piece tubular plastic trim component comprises a plurality of integral, one-piece tubular plastic trim components each extending around an entirety of the outer circumference of the core, the plurality of integral, one-piece tubular plastic trim components being arranged in side-by-side relation with one another along a length of the core.

3. The spreader roll as claimed in claim 1, wherein the at least one integral, one-piece tubular plastic trim component has an inner circumference disposed in facing relation with the outer circumference of the core, and the spreader roll further includes at least one feather key disposed between the inner circumference of the at least one integral, one-piece tubular plastic trim component and the outer circumference of the core.

4. The spreader roll as claimed in claim 1, wherein the at least one integral, one-piece tubular plastic trim component has an inner circumference disposed in facing relation with the outer circumference of the core, and a diameter of the inner circumference and a diameter of the outer circumference of the core are matched to each other such that the at least one integral, one-piece tubular plastic trim component is pushable over an end of the core but sits on the core without play.

5. The spreader roll as claimed in claim 1, wherein the core has a longitudinal axis and the outer circumference extends about the longitudinal axis, the core further including first and second ends spaced axially from one another, a stop disposed on the outer circumference at the first end and a thread disposed at the second end, the thread being configured for threadingly receiving a nut.

6. The spreader roll as claimed in claim 1, wherein the core comprises steel or plastic.

7. The spreader roll as claimed in claim 1, wherein the at least one integral, one-piece tubular plastic trim component is formed from polyoxymethylene (POM) or polyamide (PA).

8. The spreader roll as claimed in claim 1, wherein the core comprises carbon fiber-reinforced plastic.

9. A spreader roll for a distributing device for distributing granular material or fibers and having a frame, the spreader roll comprising:
an elongate, load-bearing core, the core being configured for mounting on the frame of the distributing device for rotation about a rotational axis, the core having a cylindrical outer surface extending circumferentially about the rotational axis; and
a trim component constructed of plastic, the trim component comprising at least one integral, one-piece tube, the at least one integral, one-piece tube having an inner surface and an outer surface facing away from the inner surface, the trim component having a plurality of bristles and/or pins disposed on and extending outwardly from at least part of the outer surface of the at least one integral, one-piece tube, the trim component being disposed in surrounding relation with the core so that the inner surface of the at least one integral, one-piece tube is disposed in facing relation with the cylindrical outer surface of the core, and the at least one integral, one-piece tube extends circumferentially about an entirety of the cylindrical outer surface of the core and is fixed to the core for rotation therewith.

10. The spreader roll according to claim 9, wherein the at least one integral, one-piece tube comprises a plurality of integral, one-piece tubes, each integral, one-piece tube having a plurality of bristles and/or pins disposed on an extending outwardly from at least part of the outer surface thereof, the plurality of integral, one-piece tubes being arranged in axially-adjacent, side-by-side relation with one another along the cylindrical outer surface of the core, and each integral, one-piece tube extends circumferentially about an entirety of the cylindrical outer surface of the core.

11. The spreader roll according to claim 9, wherein the at least one integral, one-piece tube extends circumferentially about the entirety of the cylindrical outer surface of the core in a continuous and uninterrupted manner.

12. The spreader roll according to claim 9, further comprising at least one key engaged between the inner surface of the at least one integral, one-piece tube and the cylindrical outer surface of the core to prevent rotation of the at least one integral, one-piece tube relative to the core.

13. The spreader roll according to claim 12, wherein the inner surface of the at least one integral, one-piece tube and the cylindrical outer surface of the core each include at least one axially-extending groove, the at least one axially-extending groove of the core and the at least one axially-extending groove of the at least one integral, one-piece tube opening towards one another, and the at least one key is disposed in each of the grooves.

14. The spreader roll according to claim 9, wherein the inner surface of the at least one integral, one-piece tube has a diameter of a similar dimension to a diameter of the cylindrical outer surface of the core such that the at least one integral, one-piece tube can be installed on the core by pushing and such that the at least one integral, one-piece tube sits on the cylindrical outer surface of the core without play in a radial direction relative to the rotational axis of the core.

15. The spreader roll according to claim 14, wherein the core includes first and second ends axially spaced from one another, an axial stop disposed at the first end and a threaded portion disposed at the second end and configured to threadingly receive a nut, the at least one integral, one-piece tube being disposed between the axial stop and the threaded portion.

16. The spreader roll according to claim 9, wherein the trim component is non-destructively and detachably fixed to the core.

\* \* \* \* \*